(12) United States Patent
Allen-Bradley

(10) Patent No.: US 8,979,499 B2
(45) Date of Patent: Mar. 17, 2015

(54) GAS TURBINE ENGINE AIRFOIL PROFILE

(75) Inventor: Eunice Allen-Bradley, Vernon, CT (US)

(73) Assignee: United Technologies Corporation, Hartford, CT (US)

( * ) Notice: Subject to any disclaimer, the term of this patent is extended or adjusted under 35 U.S.C. 154(b) by 654 days.

(21) Appl. No.: 13/588,056

(22) Filed: Aug. 17, 2012

(65) Prior Publication Data
US 2014/0123677 A1 May 8, 2014

(51) Int. Cl.
*F01D 5/14* (2006.01)

(52) U.S. Cl.
CPC *F01D 5/14* (2013.01); *F01D 5/141* (2013.01); *F05D 2250/74* (2013.01); *Y02T 50/672* (2013.01); *Y02T 50/673* (2013.01); *Y10S 416/05* (2013.01)
USPC .................................. 416/223 A; 416/DIG. 5

(58) Field of Classification Search
USPC ..... 415/191; 416/223 A, 243, DIG. 2, DIG. 5
See application file for complete search history.

(56) References Cited

U.S. PATENT DOCUMENTS

| | | | |
|---|---|---|---|
| 6,450,770 B1 | 9/2002 | Wang et al. | |
| 7,306,436 B2 | 12/2007 | Girgis et al. | |
| 7,329,092 B2 | 2/2008 | Keener et al. | |
| 7,329,093 B2 | 2/2008 | Vandeputte et al. | |
| 7,351,038 B2 | 4/2008 | Girgis et al. | |
| 7,354,249 B2 | 4/2008 | Girgis et al. | |
| 7,367,779 B2 | 5/2008 | Girgis et al. | |
| 7,384,243 B2 | 6/2008 | Noshi | |
| 7,396,211 B2 | 7/2008 | Tomberg et al. | |
| 7,402,026 B2 | 7/2008 | Girgis et al. | |
| 7,537,433 B2 * | 5/2009 | Girgis et al. | 416/223 A |
| 7,537,434 B2 * | 5/2009 | Cheruku et al. | 416/223 R |
| 7,559,749 B2 * | 7/2009 | Kidikian et al. | 416/223 A |
| 7,581,930 B2 | 9/2009 | Aggarwala et al. | |
| 7,625,182 B2 * | 12/2009 | Mah et al. | 416/223 A |
| 7,625,183 B2 * | 12/2009 | Tsifourdaris et al. | 416/223 A |
| 7,625,184 B2 | 12/2009 | Jay et al. | |
| 7,632,075 B2 * | 12/2009 | Liang et al. | 416/223 A |
| 7,648,340 B2 * | 1/2010 | Sadler et al. | 416/223 A |
| 7,766,624 B2 * | 8/2010 | Arinci et al. | 416/223 R |
| 7,976,280 B2 * | 7/2011 | Brittingham et al. | 416/189 |
| 8,113,786 B2 * | 2/2012 | Spracher et al. | 416/223 R |
| 2007/0154316 A1 | 7/2007 | Clarke | |
| 2007/0154318 A1 | 7/2007 | Saltman et al. | |
| 2008/0240924 A1 | 10/2008 | Kizuka et al. | |

OTHER PUBLICATIONS

International Search Report and Written Opinion for PCT Application No. PCT/US2013/054616 mailed Nov. 7, 2013.

* cited by examiner

*Primary Examiner* — Igor Kershteyn
(74) *Attorney, Agent, or Firm* — Carlson, Gaskey & Olds

(57) ABSTRACT

An airfoil for a gas turbine engine according to an exemplary aspect of the present disclosure includes, among other things, an airfoil body including a leading edge and a trailing edge joined by a pressure side and a suction side spaced apart from the pressure side to provide an external airfoil surface extending in a radial direction from at least one platform. The external airfoil surface is formed in substantial conformance with multiple cross-sectional profiles of the airfoil described by a set of Cartesian coordinates set forth in Table 1. The Cartesian coordinates are provided by an axial coordinate scaled by a local axial chord, a circumferential coordinate scaled by a local axial chord, and a span location. The local axial chord corresponds to a width of the airfoil between the leading edge and the trailing edge at the span location, and the Cartesian coordinates in Table 1 have a tolerance relative to the specified coordinates of up to ±0.050 inches (±1.27 mm).

15 Claims, 4 Drawing Sheets

GAS TURBINE ENGINE AIRFOIL PROFILE

BACKGROUND

This disclosure relates to a gas turbine engine, and more particularly to an airfoil that may be incorporated into a gas turbine engine.

Gas turbine engines typically include a compressor section, a combustor section and a turbine section. During operation, air is pressurized in the compressor section and is mixed with fuel and burned in the combustor section to generate hot combustion gases. The hot combustion gases are communicated through the turbine section, which extracts energy from the hot combustion gases to power the compressor section and other gas turbine engine loads.

Both the compressor and turbine sections may include alternating series of rotating blades and stationary vanes that extend into the core flow path of the gas turbine engine. For example, in the turbine section, turbine blades rotate and extract energy from the hot combustion gases that are communicated along the core flow path of the gas turbine engine. The turbine vanes, which generally do not rotate, guide the airflow and prepare it for the next set of blades.

A mid-turbine frame may be located generally between a high pressure turbine and a low pressure turbine of the turbine section. The mid-turbine frame acts as a load bearing structure to support one or more bearing systems of the gas turbine engine and to transfer bearing loads to an outer engine casing. The mid-turbine frame may include an array of airfoils that guide the hot combustion gases along the core flow path within the turbine section.

SUMMARY

An airfoil for a gas turbine engine according to an exemplary aspect of the present disclosure includes, among other things, an airfoil body including a leading edge and a trailing edge joined by a pressure side and a suction side spaced apart from the pressure side to provide an external airfoil surface extending in a radial direction from at least one platform. The external airfoil surface is formed in substantial conformance with multiple cross-sectional profiles of the airfoil described by a set of Cartesian coordinates set forth in Table 1. The Cartesian coordinates are provided by an axial coordinate scaled by a local axial chord, a circumferential coordinate scaled by a local axial chord, and a span location. The local axial chord corresponds to a width of the airfoil between the leading edge and the trailing edge at the span location, and the Cartesian coordinates in Table 1 have a tolerance relative to the specified coordinates of up to ±0.050 inches (±1.27 mm).

In a further non-limiting embodiment of the foregoing airfoil, the airfoil is a mid-turbine frame airfoil.

In a further non-limiting embodiment of either of the foregoing airfoils, the span location corresponds to a distance from an engine central longitudinal axis.

In a further non-limiting embodiment of any of the foregoing airfoils, the distance is measured with respect to a reference radius.

In a further non-limiting embodiment of any of the foregoing airfoils, the airfoil body extends in the radial direction between an inner platform and an outer platform.

In a further non-limiting embodiment of any of the foregoing airfoils, the tolerance is a manufacturing tolerance of ±0.050 inches (±1.27 mm).

In a further non-limiting embodiment of any of the foregoing airfoils, the tolerance is a measurement tolerance of ±0.025 inches (±0.635 mm).

A gas turbine engine according to an exemplary aspect of the present disclosure includes, among other things, a compressor section, a combustor section fluidly connected to the compressor section and a turbine section fluidly connected to the combustor section. The turbine section including a mid-turbine frame. The mid-turbine frame includes at least one airfoil. The at least one airfoil includes an airfoil body having a leading edge and a trailing edge joined by a pressure side and a suction side that is spaced from the pressure side to provide an external airfoil surface extending in a radial direction from at least one platform. The external airfoil surface is formed in substantial conformance with multiple cross-sectional profiles of the at least one airfoil described by a set of Cartesian coordinates set forth in Table 1. The Cartesian coordinates are provided by an axial coordinate scaled by a local axial chord, a circumferential coordinate scaled by a local axial chord, and a span location. The local axial chord corresponds to a width of the airfoil between the leading edge and the trailing edge at the span location, and the Cartesian coordinates in Table 1 have a tolerance relative to the specified coordinates of up to ±0.050 inches (±1.27 mm).

In a further non-limiting embodiment of the foregoing gas turbine engine, the mid-turbine frame includes fourteen airfoils.

In a further non-limiting embodiment of either of the foregoing gas turbine engines, the span location corresponds to a distance from an engine central longitudinal axis.

In a further non-limiting embodiment of any of the foregoing gas turbine engines, the distance is measured with respect to the reference radius.

In a further non-limiting embodiment of any of the foregoing gas turbine engines, the airfoil body includes a root portion, a mid-span portion and a tip portion.

In a further non-limiting embodiment of any of the foregoing gas turbine engines, the airfoil body extends in the radial direction between an inner platform and an outer platform.

In a further non-limiting embodiment of any of the foregoing gas turbine engines, the tolerance is a manufacturing tolerance of ±0.050 inches (±1.27 mm).

In a further non-limiting embodiment of any of the foregoing gas turbine engines, the tolerance is a measurement tolerance of ±0.025 inches (±0.635 mm).

The various features and advantages of this disclosure will become apparent to those skilled in the art from the following detailed description. The drawings that accompany the detailed description can be briefly described as follows.

DETAILED DESCRIPTION

Figure 1:
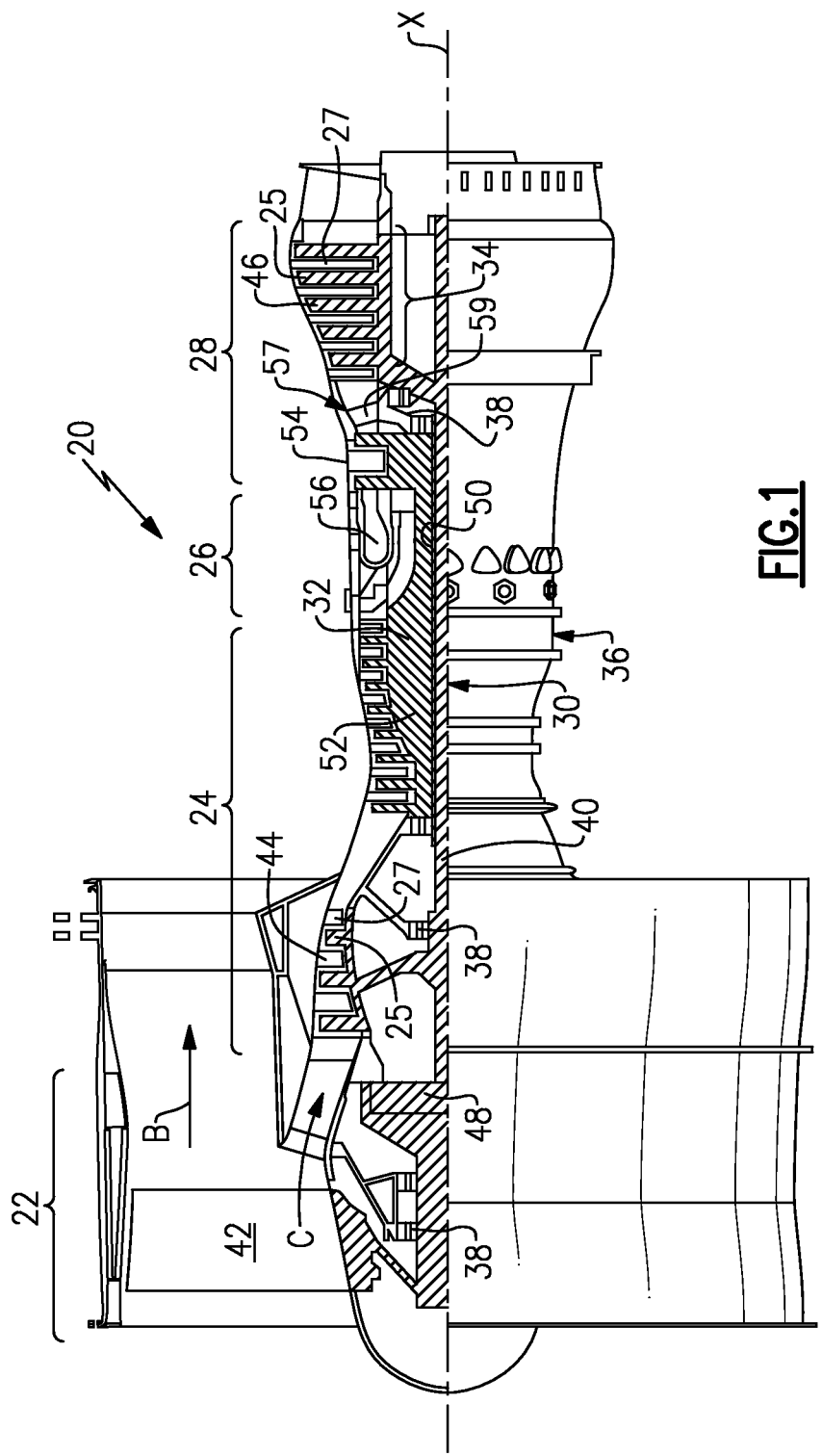
FIG. 1 illustrates a schematic, cross-sectional view of a gas turbine engine.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines. For example, the gas turbine engine 20 may include a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example gas turbine engine 20 generally includes a low speed spool 30 and a high speed spool 32 mounted for rotation about an engine central longitudinal axis X relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis X.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 57 of the engine static structure 36 is arranged generally between the high pressure turbine 54 and the low pressure turbine 46. The mid-turbine frame 57 further supports bearing systems 38 in the turbine section 28 as well as setting airflow entering the low pressure turbine 46.

The core airflow C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 57 includes airfoils 59, such as vanes, which extend within the core flow path C and function as an inlet guide vane for the low pressure turbine 46. Utilizing the airfoils 59 of the mid-turbine frame 57 as the inlet guide vane for low pressure turbine 46 decreases the length of the low pressure turbine 46 without increasing the axial length of the mid-turbine frame 57. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of "T"/$518.7^{0.5}$, where T represents the ambient temperature in degrees Rankine. The "Low corrected fan tip speed", as disclosed herein according to one non-limiting embodiment, is less than about 1150 ft/second.

Each of the compressor section 24 and the turbine section 28 may include alternating rows of rotor assemblies and vane assemblies (shown schematically) that carry airfoils that extend into the core flow path C. For example, the rotor assemblies can carry a plurality of rotating blades 25, while each vane assembly can carry a plurality of vanes 27 that extend into the core flow path C. The blades 25 of the rotor assemblies create or extract energy (in the form of pressure) from the core airflow that is communicated through the gas turbine engine 20 along the core flow path C. The vanes 27 of the vane assemblies direct the core air flow to the blades 25 to either add or extract energy. The various airfoils of the gas turbine engine 20 may include a specific geometry. Example geometries of an airfoil that can be incorporated into the gas turbine engine 20 are described below.

Figure 2:
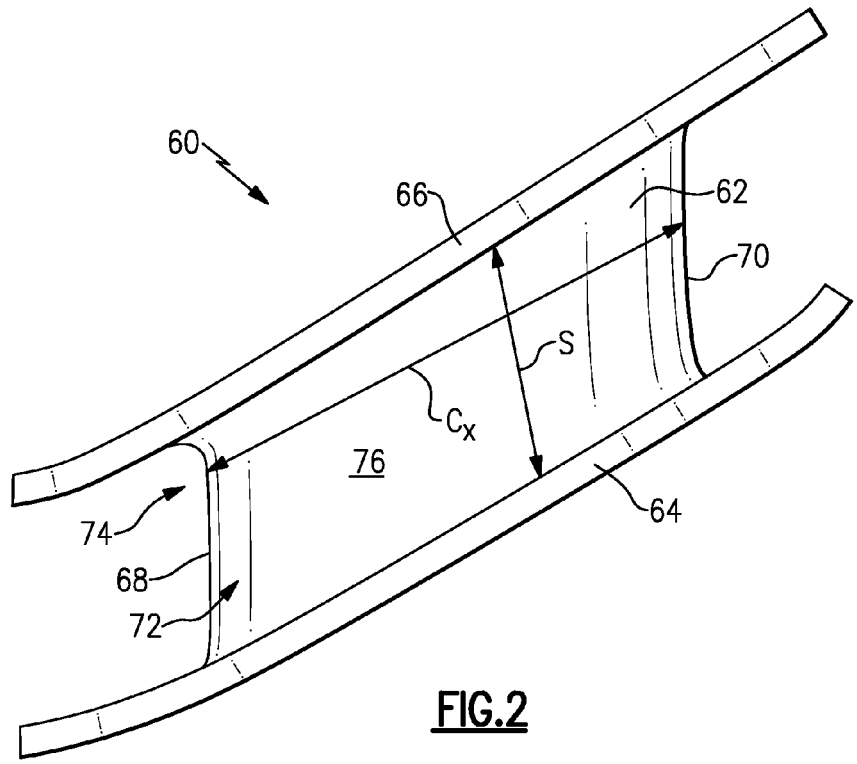
FIG. 2 illustrate an airfoil that may be incorporated into a gas turbine engine.
Figure 3:
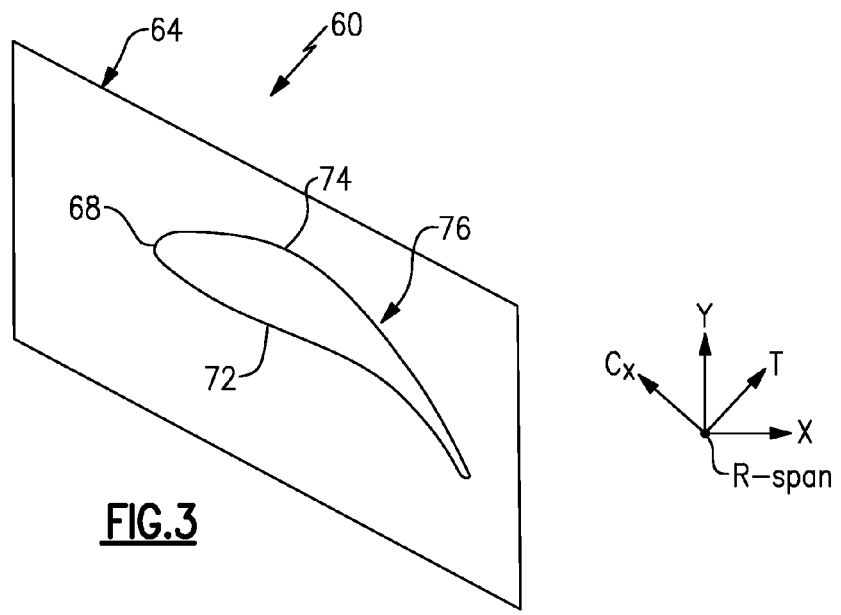
FIG. 3 illustrates a plan view of an airfoil illustrating directional references.

FIGS. 2 and 3 illustrate an airfoil 60 that may be incorporated into a gas turbine engine, such as the gas turbine engine 20. In this disclosure, the term "airfoil" is defined to encompass both blades and vanes. The airfoil 60 of this particular embodiment is an airfoil of the mid-turbine frame 57 (such as the airfoil 59 depicted in FIG. 1) of the gas turbine engine 20. In on embodiment, the mid-turbine frame 57 includes fourteen of such airfoils 60. However, this disclosure is not limited to this particular airfoil and could extend to any airfoil that is disposed within the core flow path C of the gas turbine engine 20.

The airfoil 60 includes an airfoil body 62 that extends between an inner platform 64 (on an inner diameter side) and an outer platform 66 (on an outer diameter side). The airfoil 60 also includes a leading edge 68, a trailing edge 70, a pressure side 72 (a concave side) and a suction side 74 (a convex side). The airfoil body 62 extends in a chord wise direction $C_x$ between the leading edge 68 and the trailing edge 70 and extends in span S, or in the radial direction, between the inner platform 64 and the outer platform 66. As shown best in FIG. 3, the airfoil 60 extends between the pressure side 72 and the suction side 74 in an airfoil thickness direction T, which is generally perpendicular to the cord wise direction $C_x$. The airfoil 60 can also extend circumferentially in a circumferential direction Y. The leading edge 68, trailing edge 70, pressure side 72 and suction side 74 of the airfoil body 62 establish an external airfoil surface 76 of the airfoil 60.

Figure 4A:
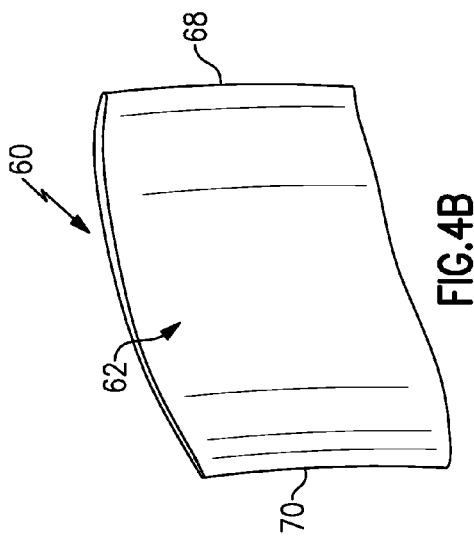
FIGS. 4A, 4B and 4C illustrate multiple views of an airfoil.
Figure 4B:
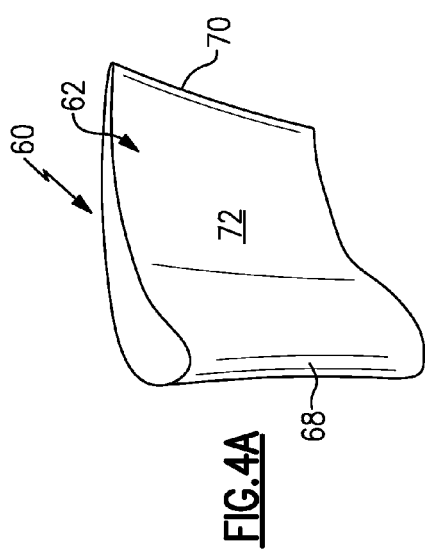
Figure 4C:
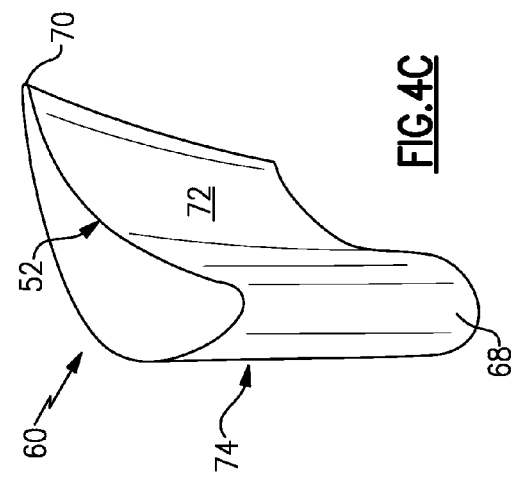

FIGS. 4A, 4B and 4C illustrate various views of the airfoil 60. The airfoil 60 may be constructed from a high strength, heat resistant material, such as a nickel based or cobalt based super alloy, or of a high temperature, stress resistant ceramic or composite material. In cooled configurations, internal fluid passages and external cooling apertures provide for a combination of impingent and film cooling. In addition, one or more thermal barrier coatings, abrasion resistance coatings or other protective coatings may be applied to the airfoil 60.

Figure 5:
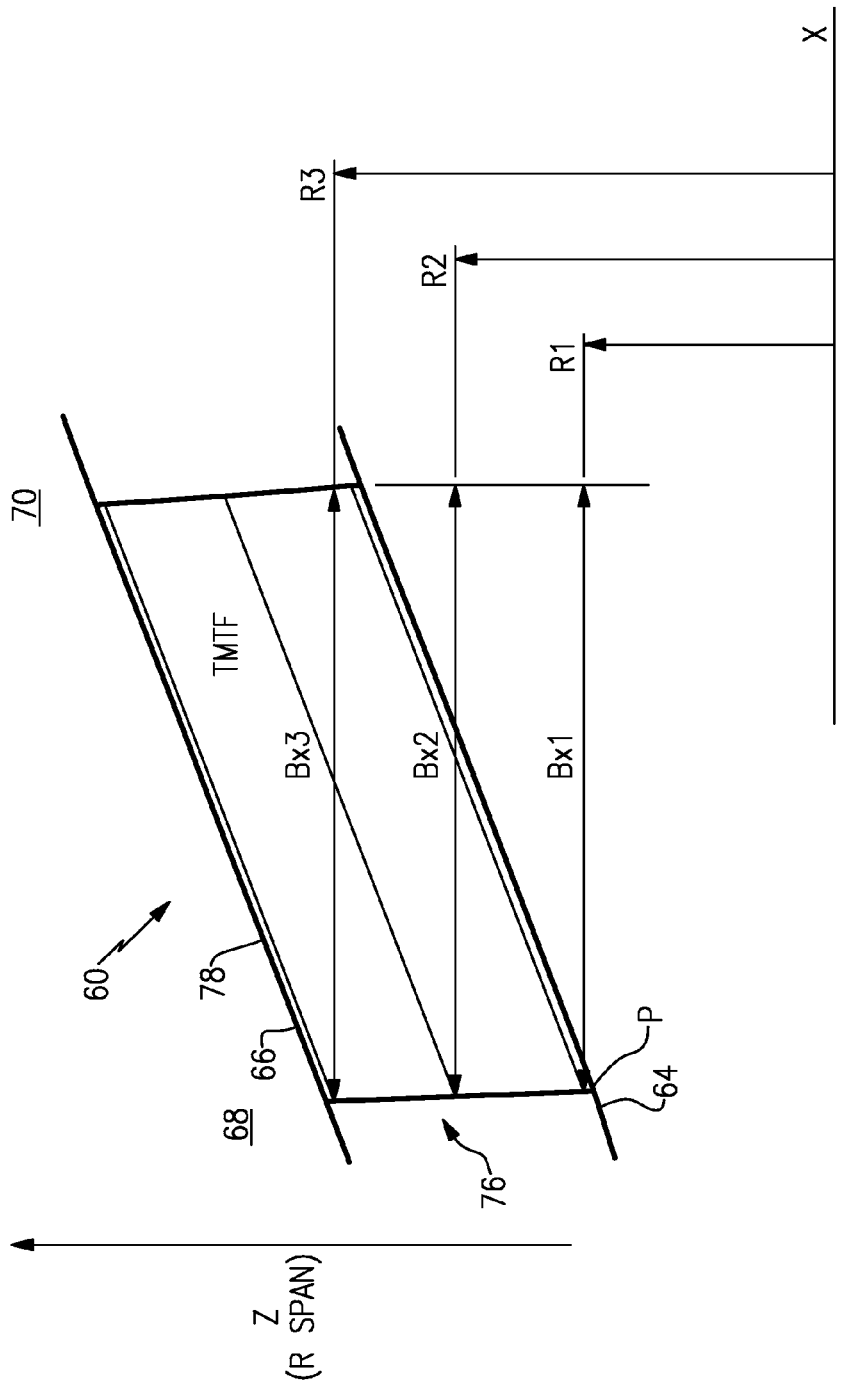
FIG. 5 illustrates multiple span positions and local axial chords of the airfoil that is referenced in Table 1.

Referring to FIG. 5 (with continued reference to FIGS. 1-4), the geometry of the external airfoil surface 76 of the airfoil 60 may be described in terms of Cartesian coordinates defined along x, y and z axes, which respectively correspond to the axial (x), circumferential (y) and radial (z) directions (See FIGS. 4A, 4B and 4C, for example). The radial coordinates are referenced from reference radii R1, R2 and R3, as shown in FIG. 5, from the engine central longitudinal axis X. In this embodiment, the "0" span is taken at a point P where the airfoil meets the inner platform 64 at the leading edge 68 (i.e., a root portion). The overall radial span is the distance from point P to a tip 78 in the radial direction (z), which corresponds to reference radius R3, or the point where the airfoil body 62 connects to the outer platform 66 at the leading edge 68 (i.e., a tip portion). The reference radius R2 represents a mid-span portion of the airfoil 60 that is between reference radii R1 and R3. In one embodiment, the reference radius R1 is 6.0817 inches (154.4759 mm), the reference radius R2 is 7.8073 inches (198.3053 mm), and the reference radius R3 is 8.8220 inches (224.0783 mm).

The axial (x) and circumferential (y) coordinates are normalized relative to a local axial chord ($B_x$) for a given reference radius R1, R2 and R3. By way of example, the local axial chord $B_{x1}$ for the axial (x) and circumferential (y) coordinates associated with the reference radius R1 corresponds to the width of the airfoil body 62 between the leading edge 68 and the trailing edge 70 at the R1 reference radius.

The geometry of the external airfoil surface 76 of the airfoil 60 is set forth in Table 1, which provides the axial (x), circumferential (y) and radial (z) (in inches) coordinates of the external airfoil surface 76. These coordinates can be coordinated to metric (mm) by multiplying by 25.4. The external airfoil surface 76 is formed in substantial conformance with multiple cross-sectional profiles of the airfoil 60 that are described by the set of Cartesian coordinates set forth in Table 1. In one embodiment, three dimensional airfoil surfaces are formed by joining adjacent points in Table 1 in a smooth manner and adjoining adjacent sections of the multiple cross-sectional profiles of the airfoil 60 along its radial span. The manufacturing tolerance relative to the specified coordinate is ±0.050 inches (±1.27 mm) The coordinates define points on a cold, uncoated, stationary airfoil surface, in a plane at multiple span positions. Additional elements such as cooling holes, protective coatings, fillets and seal structures may also be formed onto the specified airfoil surface, or onto an adjacent platform surface, but these elements are not necessarily described by the normalized coordinates of Table 1.

TABLE 1

| X/BX | Y/BX | Z-Reference Radius |
|---|---|---|
| Reference Radius R1 | | |
| Section Coordinates (X/BX1, Y/BX1, Z-Reference Radius) | | |
| 0.0000 | 0.0000 | 0.0000 |
| 0.0004 | 0.0049 | 0.0007 |
| 0.0011 | 0.0085 | 0.0019 |
| 0.0018 | 0.0108 | 0.0030 |
| 0.0025 | 0.0130 | 0.0043 |
| 0.0030 | 0.0142 | 0.0052 |
| 0.0035 | 0.0154 | 0.0060 |
| 0.0041 | 0.0165 | 0.0069 |
| 0.0047 | 0.0178 | 0.0081 |
| 0.0061 | 0.0199 | 0.0103 |
| 0.0076 | 0.0222 | 0.0130 |
| 0.0101 | 0.0252 | 0.0171 |
| 0.0138 | 0.0289 | 0.0235 |
| 0.0190 | 0.0330 | 0.0324 |
| 0.0270 | 0.0377 | 0.0460 |
| 0.0378 | 0.0423 | 0.0645 |
| 0.0519 | 0.0461 | 0.0884 |
| 0.0687 | 0.0487 | 0.1171 |
| 0.0882 | 0.0497 | 0.1504 |
| 0.1102 | 0.0490 | 0.1879 |
| 0.1348 | 0.0476 | 0.2298 |
| 0.1619 | 0.0456 | 0.2760 |
| 0.1915 | 0.0428 | 0.3266 |
| 0.2236 | 0.0390 | 0.3813 |
| 0.2569 | 0.0340 | 0.4380 |
| 0.2925 | 0.0274 | 0.4988 |
| 0.3290 | 0.0189 | 0.5610 |
| 0.3651 | 0.0086 | 0.6226 |
| 0.4019 | −0.0043 | 0.6853 |
| 0.4379 | −0.0196 | 0.7467 |
| 0.4731 | −0.0375 | 0.8066 |
| 0.5071 | −0.0580 | 0.8647 |
| 0.5401 | −0.0810 | 0.9209 |
| 0.5719 | −0.1064 | 0.9752 |
| 0.6026 | −0.1340 | 1.0275 |
| 0.6322 | −0.1634 | 1.0779 |
| 0.6608 | −0.1946 | 1.1267 |
| 0.6885 | −0.2273 | 1.1739 |
| 0.7154 | −0.2613 | 1.2198 |
| 0.7416 | −0.2964 | 1.2645 |
| 0.7671 | −0.3326 | 1.3081 |
| 0.7921 | −0.3698 | 1.3506 |
| 0.8157 | −0.4065 | 1.3909 |
| 0.8389 | −0.4443 | 1.4304 |
| 0.8607 | −0.4814 | 1.4677 |
| 0.8806 | −0.5165 | 1.5016 |
| 0.8994 | −0.5508 | 1.5335 |
| 0.9163 | −0.5829 | 1.5624 |
| 0.9315 | −0.6126 | 1.5883 |
| 0.9449 | −0.6398 | 1.6113 |
| 0.9568 | −0.6643 | 1.6315 |
| 0.9671 | −0.6862 | 1.6491 |
| 0.9759 | −0.7053 | 1.6642 |
| 0.9833 | −0.7217 | 1.6768 |
| 0.9893 | −0.7351 | 1.6869 |
| 0.9939 | −0.7456 | 1.6948 |
| 0.9972 | −0.7531 | 1.7003 |
| 0.9996 | −0.7591 | 1.7044 |
| 1.0000 | −0.7642 | 1.7052 |
| 0.9994 | −0.7672 | 1.7041 |
| 0.9981 | −0.7697 | 1.7019 |
| 0.9971 | −0.7709 | 1.7003 |

TABLE 1-continued

| X/BX | Y/BX | Z-Reference Radius |
|---|---|---|
| 0.9962 | −0.7718 | 1.6986 |
| 0.9951 | −0.7724 | 1.6968 |
| 0.9940 | −0.7729 | 1.6949 |
| 0.9916 | −0.7732 | 1.6908 |
| 0.9891 | −0.7726 | 1.6866 |
| 0.9857 | −0.7704 | 1.6808 |
| 0.9823 | −0.7654 | 1.6750 |
| 0.9784 | −0.7590 | 1.6682 |
| 0.9727 | −0.7500 | 1.6587 |
| 0.9654 | −0.7385 | 1.6462 |
| 0.9565 | −0.7246 | 1.6309 |
| 0.9457 | −0.7085 | 1.6126 |
| 0.9331 | −0.6901 | 1.5910 |
| 0.9185 | −0.6697 | 1.5661 |
| 0.9018 | −0.6474 | 1.5378 |
| 0.8830 | −0.6234 | 1.5057 |
| 0.8618 | −0.5979 | 1.4696 |
| 0.8383 | −0.5713 | 1.4294 |
| 0.8131 | −0.5448 | 1.3865 |
| 0.7853 | −0.5177 | 1.3390 |
| 0.7556 | −0.4913 | 1.2885 |
| 0.7252 | −0.4665 | 1.2366 |
| 0.6929 | −0.4426 | 1.1815 |
| 0.6600 | −0.4206 | 1.1254 |
| 0.6265 | −0.4003 | 1.0683 |
| 0.5924 | −0.3816 | 1.0102 |
| 0.5579 | −0.3644 | 0.9513 |
| 0.5230 | −0.3484 | 0.8919 |
| 0.4880 | −0.3333 | 0.8322 |
| 0.4529 | −0.3187 | 0.7722 |
| 0.4177 | −0.3043 | 0.7123 |
| 0.3827 | −0.2898 | 0.6526 |
| 0.3478 | −0.2749 | 0.5931 |
| 0.3133 | −0.2593 | 0.5343 |
| 0.2793 | −0.2429 | 0.4763 |
| 0.2459 | −0.2253 | 0.4193 |
| 0.2142 | −0.2072 | 0.3653 |
| 0.1833 | −0.1880 | 0.3126 |
| 0.1543 | −0.1683 | 0.2632 |
| 0.1282 | −0.1492 | 0.2187 |
| 0.1038 | −0.1300 | 0.1771 |
| 0.0821 | −0.1116 | 0.1400 |
| 0.0628 | −0.0944 | 0.1071 |
| 0.0459 | −0.0785 | 0.0782 |
| 0.0314 | −0.0637 | 0.0535 |
| 0.0198 | −0.0496 | 0.0338 |
| 0.0111 | −0.0365 | 0.0190 |
| 0.0052 | −0.0247 | 0.0089 |
| 0.0017 | −0.0145 | 0.0030 |
| 0.0002 | −0.0061 | 0.0004 |

Reference Radius R2
Section Coordinates (X/BX2, Y/BX2, Z-Reference Radius)

| X/BX2 | Y/BX2 | Z-Reference Radius |
|---|---|---|
| 0.0000 | 0.0000 | 0.0000 |
| 0.0004 | 0.0038 | 0.0006 |
| 0.0008 | 0.0064 | 0.0014 |
| 0.0014 | 0.0089 | 0.0024 |
| 0.0018 | 0.0101 | 0.0031 |
| 0.0022 | 0.0114 | 0.0038 |
| 0.0027 | 0.0127 | 0.0047 |
| 0.0033 | 0.0141 | 0.0057 |
| 0.0045 | 0.0165 | 0.0077 |
| 0.0059 | 0.0190 | 0.0101 |
| 0.0084 | 0.0225 | 0.0143 |
| 0.0122 | 0.0268 | 0.0207 |
| 0.0175 | 0.0315 | 0.0298 |
| 0.0258 | 0.0370 | 0.0439 |
| 0.0373 | 0.0425 | 0.0635 |
| 0.0520 | 0.0472 | 0.0885 |
| 0.0699 | 0.0508 | 0.1191 |
| 0.0907 | 0.0529 | 0.1546 |
| 0.1143 | 0.0538 | 0.1948 |
| 0.1409 | 0.0543 | 0.2401 |
| 0.1701 | 0.0539 | 0.2899 |
| 0.2021 | 0.0524 | 0.3444 |
| 0.2367 | 0.0492 | 0.4034 |
| 0.2724 | 0.0440 | 0.4642 |
| 0.3103 | 0.0359 | 0.5288 |
| 0.3492 | 0.0245 | 0.5951 |
| 0.3870 | 0.0101 | 0.6594 |
| 0.4249 | −0.0082 | 0.7241 |
| 0.4615 | −0.0298 | 0.7864 |
| 0.4965 | −0.0546 | 0.8462 |
| 0.5301 | −0.0820 | 0.9033 |
| 0.5623 | −0.1120 | 0.9582 |
| 0.5932 | −0.1441 | 1.0108 |
| 0.6228 | −0.1780 | 1.0614 |
| 0.6514 | −0.2134 | 1.1101 |
| 0.6790 | −0.2502 | 1.1572 |
| 0.7059 | −0.2881 | 1.2029 |
| 0.7320 | −0.3271 | 1.2474 |
| 0.7574 | −0.3670 | 1.2907 |
| 0.7822 | −0.4077 | 1.3329 |
| 0.8064 | −0.4495 | 1.3743 |
| 0.8293 | −0.4905 | 1.4132 |
| 0.8516 | −0.5323 | 1.4513 |
| 0.8726 | −0.5733 | 1.4871 |
| 0.8916 | −0.6120 | 1.5195 |
| 0.9095 | −0.6497 | 1.5499 |
| 0.9254 | −0.6848 | 1.5770 |
| 0.9396 | −0.7174 | 1.6011 |
| 0.9520 | −0.7470 | 1.6223 |
| 0.9628 | −0.7740 | 1.6408 |
| 0.9720 | −0.7979 | 1.6565 |
| 0.9798 | −0.8188 | 1.6697 |
| 0.9862 | −0.8367 | 1.6806 |
| 0.9912 | −0.8514 | 1.6892 |
| 0.9951 | −0.8629 | 1.6957 |
| 0.9978 | −0.8711 | 1.7003 |
| 0.9998 | −0.8777 | 1.7038 |
| 1.0000 | −0.8828 | 1.7042 |
| 0.9990 | −0.8860 | 1.7025 |
| 0.9974 | −0.8885 | 1.6997 |
| 0.9963 | −0.8894 | 1.6979 |
| 0.9952 | −0.8901 | 1.6959 |
| 0.9940 | −0.8906 | 1.6939 |
| 0.9928 | −0.8908 | 1.6918 |
| 0.9902 | −0.8906 | 1.6874 |
| 0.9876 | −0.8895 | 1.6830 |
| 0.9845 | −0.8866 | 1.6777 |
| 0.9816 | −0.8809 | 1.6727 |
| 0.9781 | −0.8738 | 1.6669 |
| 0.9733 | −0.8639 | 1.6586 |
| 0.9670 | −0.8512 | 1.6479 |
| 0.9591 | −0.8358 | 1.6345 |
| 0.9497 | −0.8177 | 1.6185 |
| 0.9387 | −0.7972 | 1.5997 |
| 0.9259 | −0.7742 | 1.5779 |
| 0.9112 | −0.7489 | 1.5529 |
| 0.8945 | −0.7214 | 1.5244 |
| 0.8756 | −0.6920 | 1.4922 |
| 0.8544 | −0.6610 | 1.4560 |
| 0.8314 | −0.6297 | 1.4169 |
| 0.8058 | −0.5973 | 1.3732 |
| 0.7782 | −0.5653 | 1.3262 |
| 0.7496 | −0.5349 | 1.2774 |
| 0.7189 | −0.5052 | 1.2251 |
| 0.6872 | −0.4773 | 1.1711 |
| 0.6546 | −0.4513 | 1.1155 |
| 0.6213 | −0.4269 | 1.0587 |
| 0.5873 | −0.4041 | 1.0008 |
| 0.5528 | −0.3827 | 0.9420 |
| 0.5179 | −0.3623 | 0.8826 |
| 0.4828 | −0.3428 | 0.8227 |
| 0.4475 | −0.3239 | 0.7626 |
| 0.4121 | −0.3054 | 0.7023 |
| 0.3768 | −0.2871 | 0.6421 |
| 0.3416 | −0.2688 | 0.5821 |
| 0.3066 | −0.2502 | 0.5225 |
| 0.2719 | −0.2311 | 0.4634 |
| 0.2389 | −0.2121 | 0.4071 |
| 0.2063 | −0.1923 | 0.3515 |
| 0.1753 | −0.1726 | 0.2988 |
| 0.1472 | −0.1535 | 0.2508 |
| 0.1206 | −0.1345 | 0.2055 |
| 0.0967 | −0.1165 | 0.1648 |

TABLE 1-continued

| X/BX | Y/BX | Z-Reference Radius |
|---|---|---|
| 0.0754 | −0.0997 | 0.1284 |
| 0.0563 | −0.0840 | 0.0960 |
| 0.0398 | −0.0696 | 0.0678 |
| 0.0262 | −0.0558 | 0.0447 |
| 0.0158 | −0.0428 | 0.0268 |
| 0.0082 | −0.0309 | 0.0140 |
| 0.0034 | −0.0203 | 0.0059 |
| 0.0010 | −0.0116 | 0.0016 |
| 0.0001 | −0.0052 | 0.0001 |

Reference Radius R3
Section Coordinates (X/BX3, Y/BX3, Z-Reference Radius)

| X/BX | Y/BX | Z-Reference Radius |
|---|---|---|
| 0.0000 | 0.0000 | 0.0000 |
| 0.0002 | 0.0028 | 0.0003 |
| 0.0003 | 0.0042 | 0.0005 |
| 0.0005 | 0.0054 | 0.0009 |
| 0.0008 | 0.0070 | 0.0014 |
| 0.0011 | 0.0084 | 0.0019 |
| 0.0020 | 0.0113 | 0.0034 |
| 0.0031 | 0.0142 | 0.0052 |
| 0.0051 | 0.0183 | 0.0086 |
| 0.0084 | 0.0234 | 0.0143 |
| 0.0133 | 0.0292 | 0.0226 |
| 0.0213 | 0.0364 | 0.0362 |
| 0.0326 | 0.0439 | 0.0555 |
| 0.0477 | 0.0514 | 0.0811 |
| 0.0662 | 0.0581 | 0.1126 |
| 0.0881 | 0.0643 | 0.1498 |
| 0.1132 | 0.0693 | 0.1926 |
| 0.1416 | 0.0728 | 0.2408 |
| 0.1731 | 0.0740 | 0.2943 |
| 0.2075 | 0.0726 | 0.3528 |
| 0.2444 | 0.0680 | 0.4157 |
| 0.2824 | 0.0602 | 0.4803 |
| 0.3226 | 0.0486 | 0.5486 |
| 0.3633 | 0.0334 | 0.6179 |
| 0.4030 | 0.0153 | 0.6854 |
| 0.4429 | −0.0063 | 0.7533 |
| 0.4816 | −0.0307 | 0.8191 |
| 0.5189 | −0.0578 | 0.8826 |
| 0.5549 | −0.0875 | 0.9437 |
| 0.5894 | −0.1197 | 1.0024 |
| 0.6223 | −0.1543 | 1.0583 |
| 0.6533 | −0.1914 | 1.1111 |
| 0.6824 | −0.2308 | 1.1606 |
| 0.7093 | −0.2726 | 1.2063 |
| 0.7340 | −0.3165 | 1.2483 |
| 0.7568 | −0.3620 | 1.2872 |
| 0.7783 | −0.4087 | 1.3237 |
| 0.7990 | −0.4562 | 1.3588 |
| 0.8190 | −0.5043 | 1.3930 |
| 0.8381 | −0.5512 | 1.4253 |
| 0.8569 | −0.5986 | 1.4573 |
| 0.8749 | −0.6446 | 1.4880 |
| 0.8915 | −0.6877 | 1.5163 |
| 0.9075 | −0.7293 | 1.5434 |
| 0.9221 | −0.7677 | 1.5683 |
| 0.9355 | −0.8030 | 1.5910 |
| 0.9476 | −0.8351 | 1.6115 |
| 0.9584 | −0.8638 | 1.6299 |
| 0.9679 | −0.8893 | 1.6462 |
| 0.9762 | −0.9114 | 1.6602 |
| 0.9832 | −0.9301 | 1.6721 |
| 0.9889 | −0.9455 | 1.6819 |
| 0.9934 | −0.9575 | 1.6895 |
| 0.9966 | −0.9660 | 1.6949 |
| 0.9992 | −0.9729 | 1.6993 |
| 1.0000 | −0.9783 | 1.7007 |
| 0.9993 | −0.9817 | 1.6996 |
| 0.9978 | −0.9845 | 1.6969 |
| 0.9967 | −0.9857 | 1.6950 |
| 0.9955 | −0.9865 | 1.6930 |
| 0.9943 | −0.9870 | 1.6910 |
| 0.9930 | −0.9873 | 1.6888 |
| 0.9905 | −0.9873 | 1.6845 |
| 0.9878 | −0.9863 | 1.6799 |
| 0.9845 | −0.9834 | 1.6744 |
| 0.9813 | −0.9778 | 1.6688 |
| 0.9774 | −0.9708 | 1.6623 |
| 0.9720 | −0.9610 | 1.6531 |
| 0.9650 | −0.9485 | 1.6412 |
| 0.9564 | −0.9333 | 1.6265 |
| 0.9461 | −0.9155 | 1.6090 |
| 0.9341 | −0.8951 | 1.5886 |
| 0.9203 | −0.8722 | 1.5651 |
| 0.9046 | −0.8469 | 1.5385 |
| 0.8871 | −0.8193 | 1.5086 |
| 0.8674 | −0.7895 | 1.4752 |
| 0.8458 | −0.7577 | 1.4384 |
| 0.8228 | −0.7253 | 1.3993 |
| 0.7975 | −0.6912 | 1.3564 |
| 0.7708 | −0.6566 | 1.3109 |
| 0.7435 | −0.6230 | 1.2645 |
| 0.7147 | −0.5891 | 1.2154 |
| 0.6852 | −0.5562 | 1.1654 |
| 0.6552 | −0.5242 | 1.1143 |
| 0.6246 | −0.4933 | 1.0623 |
| 0.5935 | −0.4634 | 1.0094 |
| 0.5619 | −0.4344 | 0.9557 |
| 0.5298 | −0.4064 | 0.9011 |
| 0.4973 | −0.3794 | 0.8458 |
| 0.4645 | −0.3532 | 0.7899 |
| 0.4312 | −0.3279 | 0.7334 |
| 0.3977 | −0.3033 | 0.6764 |
| 0.3640 | −0.2793 | 0.6190 |
| 0.3301 | −0.2560 | 0.5614 |
| 0.2961 | −0.2330 | 0.5036 |
| 0.2633 | −0.2111 | 0.4477 |
| 0.2305 | −0.1895 | 0.3919 |
| 0.1989 | −0.1686 | 0.3382 |
| 0.1697 | −0.1492 | 0.2886 |
| 0.1418 | −0.1304 | 0.2412 |
| 0.1163 | −0.1131 | 0.1978 |
| 0.0933 | −0.0971 | 0.1586 |
| 0.0726 | −0.0825 | 0.1234 |
| 0.0542 | −0.0693 | 0.0922 |
| 0.0381 | −0.0576 | 0.0648 |
| 0.0249 | −0.0466 | 0.0423 |
| 0.0149 | −0.0360 | 0.0253 |
| 0.0079 | −0.0263 | 0.0135 |
| 0.0037 | −0.0180 | 0.0062 |
| 0.0015 | −0.0118 | 0.0026 |
| 0.0004 | −0.0065 | 0.0007 |
| 0.0000 | −0.0027 | 0.0001 |

In general, the airfoil 60, as described herein, has a combination of axial sweep and tangential lean. Depending on the configuration, the lean and sweep angles sometimes vary by up to ±10° or more. In addition, the airfoil 60 can be rotated with respect to a radial axis or normal to the platform or shroud surface, for example by up to ±10° or more.

Novel aspects of the airfoil 60 and the external airfoil surface 76 are achieved by substantial conformance to specified geometries. Substantial conformance generally includes or may include a manufacturing tolerance of about ±0.050 inches (±1.27 mm), in order to account for variations in molding, cutting, shaping, surface finishing and other manufacturing processes, and to accommodate variability in coating thicknesses. Substantial conformance may also include a measurement tolerance of about ±0.025 inches (±0.635 mm) These tolerances are generally constant or not scalable, and apply to each of the specified blade surfaces, regardless of size.

Substantial conformance is based on sets of points representing a three-dimensional surface with particular physical dimensions, for example in inches or millimeters, as determined by selecting particular values of the scaling parameters. A substantially conforming airfoil, blade or vane structure has surfaces that conform to the specified sets of points, within the specified tolerance.

Alternatively, substantial conformance is based on a determination by a national or international regulatory body, for example in a part certification or part manufacture approval (PMA) process for the Federal Aviation Administration, the European Aviation Safety Agency, the Civil Aviation Administration of China, the Japan Civil Aviation Bureau, or the Russian Federal Agency for Air Transport. In these configurations, substantial conformance encompasses a determination that a particular part or structure is identical to, or sufficiently similar to, the specified airfoil, blade or vane, or that the part or structure is sufficiently the same with respect to a part design in a type-certified or type-certificated airfoil, blade or vane, such that the part or structure complies with airworthiness standards applicable to the specified blade, vane or airfoil. In particular, substantial conformance encompasses any regulatory determination that a particular part or structure is sufficiently similar to, identical to, or the same as a specified blade, vane or airfoil, such that certification or authorization for use is based at least in part on the determination of similarity.

Although the different non-limiting embodiments are illustrative as having specific components, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should also be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would recognize that various modifications could come within the scope of this disclosure. For these reasons, the following claims should be studied to determine the true scope and content of this disclosure.

What is claimed is:

1. An airfoil for a gas turbine engine, comprising:
   an airfoil body including a leading edge and a trailing edge joined by a pressure side and a suction side spaced apart from said pressure side to provide an external airfoil surface extending in a radial direction from at least one platform; and
   wherein said external airfoil surface is formed in substantial conformance with multiple cross-sectional profiles of the airfoil described by a set of Cartesian coordinates set forth in Table 1, said Cartesian coordinates provided by an axial coordinate scaled by a local axial chord, a circumferential coordinate scaled by a local axial chord, and a span location, wherein said local axial chord corresponds to a width of the airfoil between said leading edge and said trailing edge at said span location and said Cartesian coordinates in Table 1 have a tolerance relative to the specified coordinates of up to ±0.050 inches (±1.27 mm).

2. The airfoil as recited in claim 1, wherein the airfoil is a mid-turbine frame airfoil.

3. The airfoil as recited in claim 1, wherein the span location corresponds to a distance from an engine central longitudinal axis.

4. The airfoil as recited in claim 3, wherein said distance is measured with respect to a reference radius.

5. The airfoil as recited in claim 1, wherein said airfoil body extends in said radial direction between an inner platform and an outer platform.

6. The airfoil as recited in claim 1, wherein said tolerance is a manufacturing tolerance of ±0.050 inches (±1.27 mm).

7. The airfoil as recited in claim 1, wherein said tolerance is a measurement tolerance of ±0.025 inches (±0.635 mm).

8. A gas turbine engine comprising:
   a compressor section;
   a combustor section fluidly connected to said compressor section;
   a turbine section fluidly connected to said combustor section, said turbine section including a mid-turbine frame;
   wherein said mid-turbine frame includes at least one airfoil, wherein said at least one airfoil includes an airfoil body having a leading edge and a trailing edge joined by a pressure side and a suction side that is spaced from said pressure side to provide an external airfoil surface extending in a radial direction from at least one platform; and
   wherein said external airfoil surface is formed in substantial conformance with multiple cross-sectional profiles of said at least one airfoil described by a set of Cartesian coordinates set forth in Table 1, said Cartesian coordinates provided by an axial coordinate scaled by a local axial chord, a circumferential coordinate scaled by a local axial chord, and a span location, wherein said local axial chord corresponds to a width of the airfoil between said leading edge and said trailing edge at said span location and said Cartesian coordinates in Table 1 have a tolerance relative to the specified coordinates of up to ±0.050 inches (±1.27 mm).

9. The gas turbine engine as recited in claim 8, wherein said mid-turbine frame includes fourteen airfoils.

10. The gas turbine engine as recited in claim 8, wherein said span location corresponds to a distance from an engine central longitudinal axis.

11. The gas turbine engine as recited in claim 10, wherein said distance is measured with respect to said reference radius.

12. The gas turbine engine as recited in claim 8, wherein said airfoil body includes a root portion, a mid-span portion and a tip portion.

13. The gas turbine engine as recited in claim 8, wherein said airfoil body extends in said radial direction between an inner platform and an outer platform.

14. The gas turbine engine as recited in claim 8, wherein said tolerance is a manufacturing tolerance of ±0.050 inches (±1.27 mm).

15. The gas turbine engine as recited in claim 8, wherein said tolerance is a measurement tolerance of ±0.025 inches (±0.635 mm).

* * * * *